United States Patent
Dutau et al.

(10) Patent No.: US 8,427,018 B2
(45) Date of Patent: Apr. 23, 2013

(54) STATOR FOR A ROTARY ELECTRIC MACHINE HAVING FLOW CHANNELS FOR PASSING A COOLING FLUID

(75) Inventors: Alexis Dutau, Angouleme (FR); Jacques Saint-Michel, Angouleme (FR)

(73) Assignee: Moteur Leroy-Somer, Angouleme (FR)

( * ) Notice: Subject to any disclaimer, the term of this patent is extended or adjusted under 35 U.S.C. 154(b) by 292 days.

(21) Appl. No.: 12/678,954

(22) PCT Filed: Feb. 16, 2009

(86) PCT No.: PCT/FR2009/050243
§ 371 (c)(1),
(2), (4) Date: Apr. 20, 2010

(87) PCT Pub. No.: WO2009/103924
PCT Pub. Date: Aug. 27, 2009

(65) Prior Publication Data
US 2010/0207465 A1    Aug. 19, 2010

(30) Foreign Application Priority Data
Feb. 20, 2008 (FR) ...................................... 08 51095

(51) Int. Cl.
*H02K 9/00* (2006.01)
(52) U.S. Cl.
USPC ................... 310/52; 310/54; 310/58; 310/59; 310/60 A
(58) Field of Classification Search .................... 310/52, 310/54, 58, 59, 60 A
See application file for complete search history.

(56) References Cited

U.S. PATENT DOCUMENTS

| | | | | |
|---|---|---|---|---|
| 1,882,487 A | * | 10/1932 | Dupont | 310/65 |
| 2,818,515 A | * | 12/1957 | Dolenc | 310/57 |
| 4,912,350 A | | 3/1990 | Parshall et al. | |
| 5,019,737 A | * | 5/1991 | Bruno | 310/89 |
| 5,331,238 A | * | 7/1994 | Johnsen | 310/58 |
| 5,398,752 A | * | 3/1995 | Abbott | 165/171 |
| 7,103,964 B2 | | 9/2006 | Vohlgemuth | |
| 7,633,194 B2 | * | 12/2009 | Dawsey et al. | 310/57 |
| 2002/0186533 A1 | * | 12/2002 | Sakaiya et al. | 361/697 |
| 2008/0100159 A1 | * | 5/2008 | Dawsey et al. | 310/54 |
| 2010/0026111 A1 | * | 2/2010 | Monzel | 310/59 |
| 2010/0156205 A1 | * | 6/2010 | Davis et al. | 310/46 |

FOREIGN PATENT DOCUMENTS

| | | |
|---|---|---|
| JP | A-11-4554 | 1/1999 |
| SU | 437176 A1 | 7/1974 |
| WO | WO 2005/022718 A1 | 3/2005 |

OTHER PUBLICATIONS

Jul. 29, 2009 International Search Report issued in corresponding International Patent Application No. PCT/FR2009/050243 (with translation).

\* cited by examiner

*Primary Examiner* — Tran N. Nguyen
*Assistant Examiner* — Terrance Kenerly
(74) *Attorney, Agent, or Firm* — Oliff & Berridge, PLC (57) ABSTRACT

A stator for a rotary electric machine, the stator including a jacket and a stack of stator laminations placed inside the jacket, subassemblies of laminations of the stack having extensions with flow channels for passing a cooling fluid therethrough, the subassemblies being disposed in such a manner that fluid flowing along the stack is subjected to a succession of passes within the channels and of passes through wide zones extending between the channels, the stack laminations being arranged in such a manner that for at least one extension, and better for the majority, or even all of the extensions of a subassembly, the flow section made available to the flow of cooling fluid within the extension is greater than the flow section defined by the space extending radially between the extensions and the jacket.

43 Claims, 4 Drawing Sheets

STATOR FOR A ROTARY ELECTRIC MACHINE HAVING FLOW CHANNELS FOR PASSING A COOLING FLUID

The present invention relates to a rotary electric machine and more particularly to a novel stator structure for improving cooling.

U.S. Pat. No. 5,331,238 discloses a stator that includes projections at its periphery, leaving passages between them for the flow of a cooling fluid.

U.S. Pat. No. 4,912,350 describes a stator including laminations provided with openings for passing a stream of cooling air. Two adjacent laminations are angularly offset.

U.S. Pat. No. 2,818,515 describes a stator having subassemblies of laminations defining channels for passing air, the subassemblies being angularly offset. A large stream of air can flow outside the channels in the space left between the laminations and the jacket of the stator.

Application WO 2005/022718 A1 discloses a stator provided with cooling fins.

In one of its aspects, the invention seeks to further improve rotary electric machines, by proposing a stator for a rotary electric machine, the stator comprising a jacket and a stack of stator laminations placed inside the jacket, subassemblies of laminations of the stack having extensions with flow channels for passing a cooling fluid therethrough, the subassemblies being disposed in such a manner that fluid flowing along the stack is subjected to a succession of passes within the channels and of passes through wide zones extending between the channels.

For at least one extension, and better for the majority, or even all of the extensions of a subassembly, the flow section made available to the flow of cooling fluid within the extension is greater than the flow section defined by the space extending radially between the extension and the jacket.

The stack of laminations is thus arranged in such a manner that the majority of the cooling fluid passes in the channels and in the wide zones. In other words, only a small proportion of the cooling fluid passes in the gap, if any, that extends radially between the extensions and the jacket, e.g. less than 40%, better less than 30%, 20%, 10%, 5%, or 1%, said gap being, for example, restricted to clearance of 1 millimeter (mm) to 2 mm, and being used for example to receive the thickness of the welds made on the stack of laminations.

Each extension may have a plurality of fins, the channels being formed between the fins. At least two of them may be connected together by a peripheral connection.

By means of the invention, the cooling of the machine is improved without that making the stator much more complex to construct.

By means of the invention, the cooling fluid may be forced to flow through the channels and to be subjected to transitions between the channels and the wide zones, thereby encouraging good heat dissipation.

Overall, more than half of the cooling fluid may be forced to flow in the channels of two consecutive subassemblies, better more than 60%, better still more than 70%, or even more than 80%, 90%, 95%, or 99%.

The ratio:

$$\frac{\text{projecting height of the extensions } d}{\text{length of the channels } l}$$

may lie in the range 0.025 to 25, better in the range 0.1 to 5. For example, $l/d \geq 0.5$.

In embodiments of the invention, the length of at least one extension, better of a plurality of extensions or even of all the extensions, as measured along the axis of rotation of the machine, may be greater than the distance whereby said extensions project relative to the wide zones. Having extensions of small relative height makes it possible to avoid excessively affecting the magnetic uniformity of the stack of laminations.

The wide zones may be open to the jacket of the machine in which the stack of laminations is received.

The extensions of the subassemblies may be disposed in a regular staggered configuration.

As mentioned above, the stack of laminations may include a plurality of fins, which fins may extend radially, with the channels being formed between the fins. In each extension, the said plurality of fins may comprise at least two fins, and in particular a number of fins lying in the range five to 50.

The effectiveness of the fins (ratio of the effective heat exchange area to the apparent area) is preferably greater than or equal to 50%.

At least some of the fins between which the channels are formed may be united by peripheral connections, these connections preferably being made integrally with the fins. The width of the channels may be greater than the thickness of the fins and greater than the thickness of the peripheral connections. The fins and the peripheral connections may be of substantially the same thickness. The peripheral connections may be in the form of arcs. The peripheral connections may come into contact with the jacket, in particular with a circularly cylindrical surface thereof. The presence of the peripheral connections further improves cooling.

The ratio:

$$\frac{\text{channel width}}{\text{thickness of the fin contiguous with the channel}}$$

may be greater than or equal to 2, better greater than or equal to 3.

The laminations of the stack may be identical, thereby simplifying fabrication and assembly.

Each subassembly may have a plurality of extensions, in particular it may have four. These extensions may be disposed at 90° to one another.

Each extension may include a slot for passing a bar for holding together the laminations of the stack. The bar may be welded to the laminations of the stack. The slot may receive at least one fin. The above-mentioned bar may be located on one side of the fin.

On either side of the channels, each extension may include free fins, in particular at least two free fins, e.g. three free fins, increasing the heat exchange area.

The free fins may present heights that decrease on going away from the channels so as to avoid increasing the width of the strip of magnetic sheet from which the stator laminations are cut out.

Each extension may extend angularly over an angular sector lying in the range 30° to 60° about the axis of rotation of the machine.

The flow section made available to the stream of cooling fluid between the jacket and the stator may be greater than or equal to 60% of the section that would exist in the absence of the extensions, i.e. in the annular space between the jacket and the stack of laminations without the extensions, but including the bars, if any. Thus, the flow rate of cooling fluid remains relatively high, thus making it possible to cool the winding overhangs.

The length of a subassembly along the axis of rotation of the machine may lie in the range 1 to 20 times, better 5 to 10 times the hydraulic diameter of the channels.

The channels may be formed by being cut out from the laminations.

The cooling fluid may be air.

The dimension of a wide zone along the axis of rotation of the machine may be substantially equal to the dimension of the channels of an adjacent subassembly.

Each wide zone may be defined at least in part by a circularly cylindrical surface of the stack of laminations, e.g. of angular extent that is greater than or equal to 30° or 60° around the axis of rotation of the machine.

Each subassembly may comprise at least two superposed laminations.

The number of subassemblies may lie in the range 2 to 1000.

In an embodiment of the invention, the subassemblies of the stack of laminations have channels that are defined by radially inner edges situated at different distances from the axis of the stator, the edges situated angularly in register with teeth of the stator being closer to the axis than the edges situated in register with slots.

The channels that are defined by the radially inner edges that are further from the axis may be radially open towards the jacket, while those that are defined by the edges that are closer to the axis may be closed radially by portions of lamination, in particular peripheral connections interconnecting the fins. Preferably, the flow section made available to the cooling fluid is substantially equal for two consecutive channels of an extension.

The stack of laminations may include slots that extend in continuity with the channel edges that are radially closer to the axis, when the subassemblies of the stack of laminations are in a staggered configuration.

Independently or in combination with the above, the invention also provides a stator lamination for a rotary electric machine, the lamination comprising a magnetic yoke with teeth and slots formed on the radially inner side of the yoke and with cooling channels formed on the radially outer side of the yoke, in particular channels formed between fins, some of the channels being situated in register with teeth and other channels being situated in register with slots, the channels situated in register with teeth presenting radially inner edges that are closer to the center of the lamination than the channels that are situated in register with slots, the channel situated in register with teeth preferably being radially closed on the outside by portions of lamination, peripheral connections preferably interconnecting adjacent fins, the channels situated in register with slots preferably being open radially outwards, the sections of two consecutive channels preferably being substantially the same, the radial dimension of the peripheral connections being, for example, substantially the same as the difference between the radii of the radially inner edges of consecutive channels, the lamination preferably including slots outside its zones having the channels, these slots being of a depth such that their bottoms lie at substantially the same distance from the center of the lamination as the radially inner edges of the channels that are situated in register with teeth, the angular spacing between at least two consecutive slots preferably being equal to the angular spacing that exists between two consecutive channels situated in register with teeth of the stator, the number of peripheral connections and the number of said slots being equal to sixteen, for example.

The invention can be better understood on reading the following detailed description of non-limiting embodiments thereof, and on examining the accompanying drawings, in which.

Figure 1:
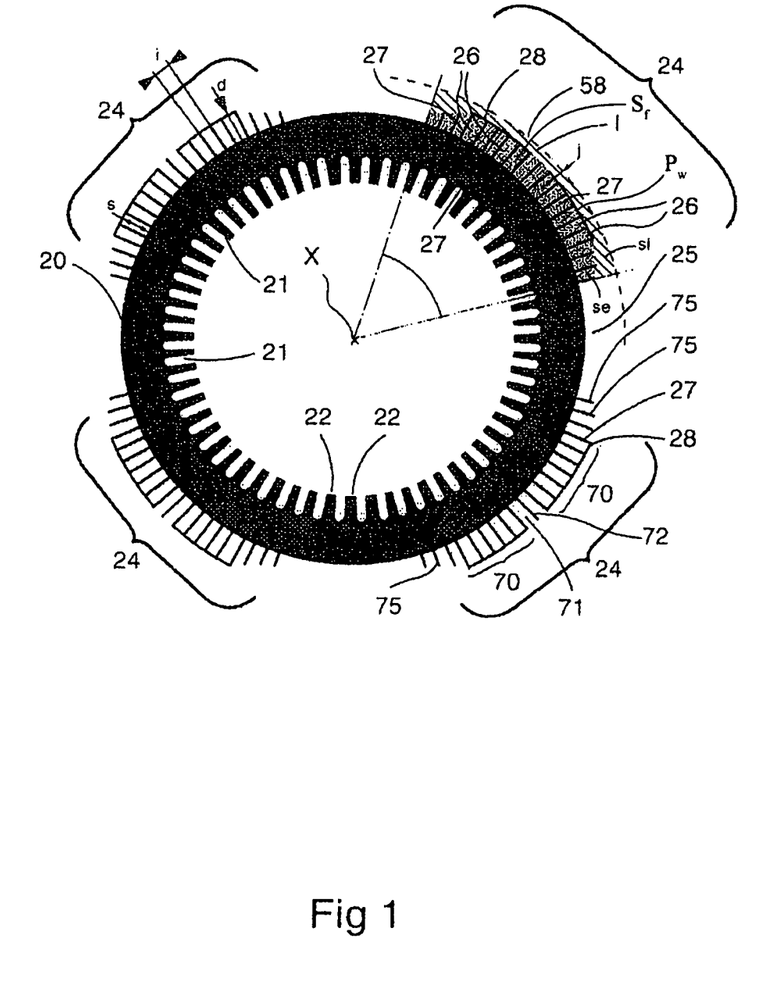
FIG. 1 is a face view of a stator lamination.
Figure 3:
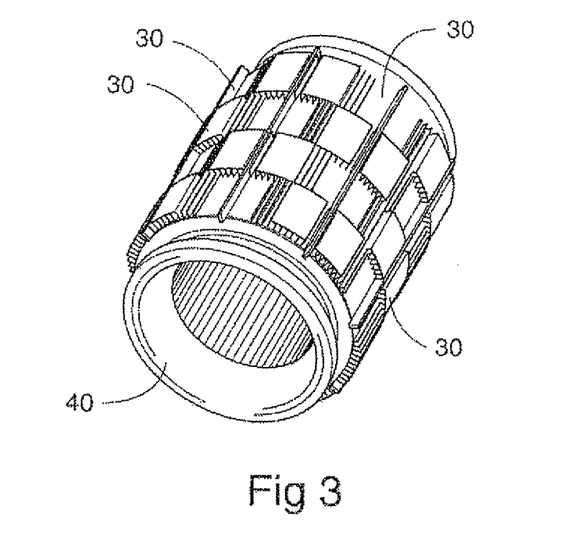
FIG. 3 is a diagram showing the assembled and wound stack of stator laminations.
Figure 4:
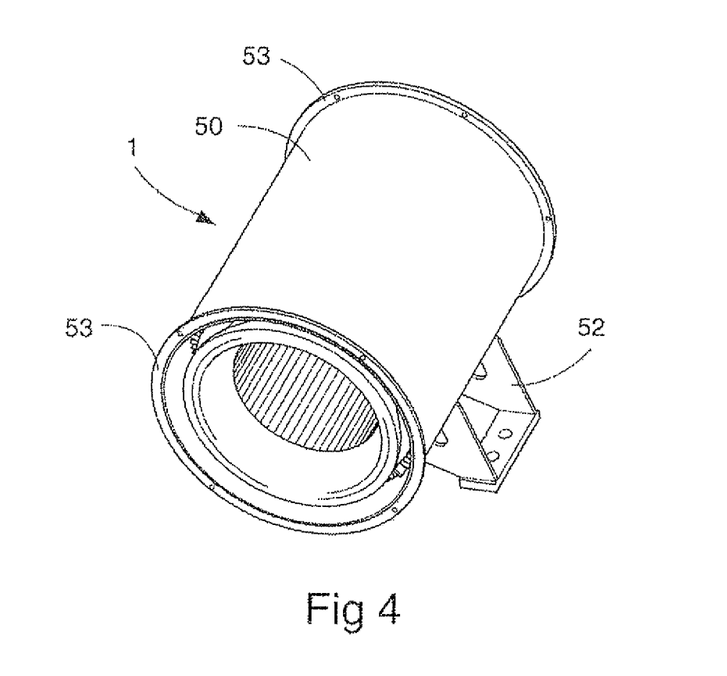
FIG. 4 is a diagrammatic perspective view of the complete stator.

The stator 1 shown in FIG. 4 comprises a stack 10 of stator laminations formed by magnetic laminations 20 such as the laminations shown in FIG. 1. These laminations 20 are assembled in compression along the axis X of rotation of the machine by bars 30 that can be seen in FIG. 3, which bars are welded to the laminations 20, as explained below.

The stator 1 includes windings 40 that are wound in slots 21 that are radially open towards the inside of the stator, the number of these slots depending on the number of poles of the machine.

Each slot 21 may be formed between two teeth 22 that may optionally include at their radially inner ends respective pole shoe.

In the example shown, the stator has a distributed winding, but in a variant, that is not shown it could have a concentrated winding, e.g. with an individual coil engaged on each tooth.

In the example described, the laminations 20 are identical, each being formed by being cut out from a magnetic sheet.

All of the laminations 20 may be cut out separately and then assembled together. In a variant, the stator may be formed by winding a strip around the axis of rotation of the machine, as described in the Applicant's U.S. Pat. No. 7,103,964.

The stack 10 is received in a jacket 50 that may include fastener means 52 for fastening to a mount, e.g. such as a stand having holes for receiving anchor bolts.

The jacket 50 may comprise a tubular body provided at its ends with flanges 53 for mounting end plates that are to support ball bearings for rotatably receiving the shaft of the machine rotor (not shown).

Figure 2:
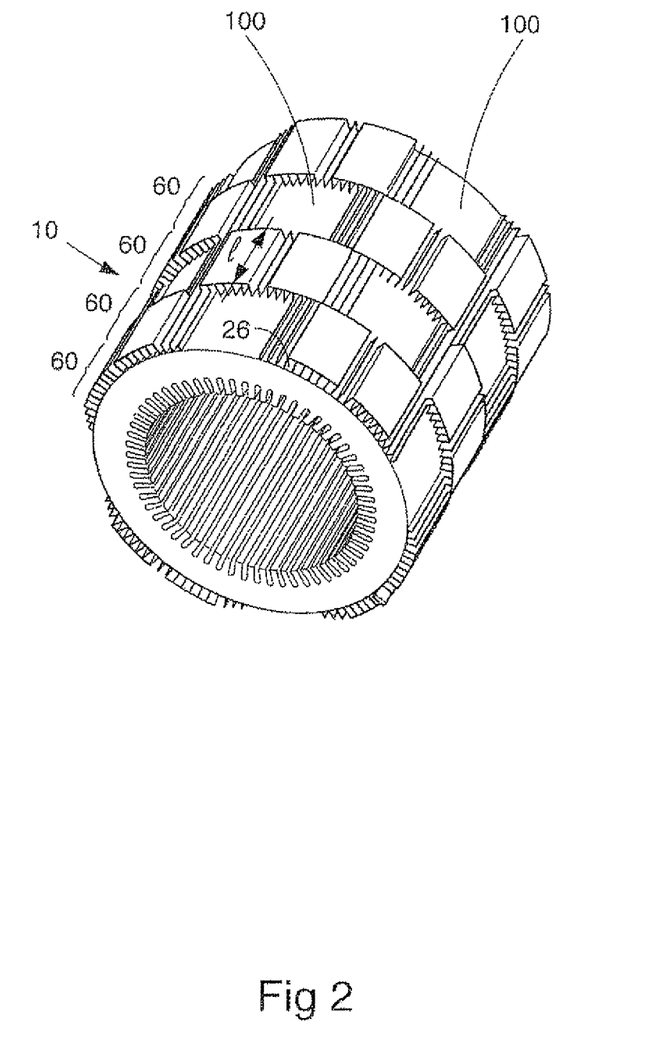
FIG. 2 is a diagrammatic perspective view of the stack stator laminations of the machine.

In FIG. 2, it can be seen that the stack 10 is made up of a plurality of subassemblies 60, each comprising a number of superposed laminations 20, e.g. a number lying in the range 2 to 2000 laminations.

In the example described, the stack of laminations comprises four subassemblies 60 each of dimension l measured parallel to the axis X of rotation of the machine that is the same from one subassembly to another. By way of example, this length l lies in the range 1 mm to 1500 mm.

In the example described, each lamination 20 has four radial extensions 24, each extending angularly around the axis X over an angular sector α, e.g. lying in the range 30° to 60°, e.g. about 45°.

Each extension 24 extends radially outwards from the circular outline 25 of the laminations 20 by a distance d less than l, where the distance d lies for example in the range 1 mm to 50 mm.

Channels 26 are formed within each extension 24 between fins 27 that extend radially outwards, the fins 27 being united at their radially outer ends by peripheral connections 28 that, in the example described, are circular arcs centered on the axis X. All of these connections 28 come into contact with the inside surface 58 of the jacket or lie with small clearance inside the jacket, e.g. with radial clearance j that is less than or equal to 2 mm, due to the presence of welds.

The section $s_e$ made available for passing air within an extension 24, shown stippled in FIG. 1, is greater than the section $s_f$ defined by the space I extending radially between the extension 24 and the inside surface of the jacket 50, shown shaded in FIG. 1. For example, $s_f \leq 0.4\ s_e$, better $s_f \leq 0.3\ s_e$, or indeed $s_f \leq 0.2\ s_e$, $s_f \leq 0.01\ s_e$, $s_f \leq 0.005\ s_e$, or $s_f \leq 0.001\ s_e$.

The fins 27 and the peripheral connections 28 may be made by being cut out from a single sheet together with the remainder of the lamination 20.

By way of example, the number of channels 26 lies in the range 2 to 50 for each extension 24.

The radial dimensions s of a fin 27 defining a channel 26 at least in part may lie for example in the range 9 mm to 48 mm.

The angular spacing i between two adjacent fins 27 defining a channel 26 at least in part may lie for example in the range 1° to 45°.

In the example described, each extension 24 has two groups 70 of consecutive fins 27 united by peripheral connections 28, these groups 70 being separated by a recess 71 split in two by a fin 72 that lies at substantially equal distances from both groups 70.

The recess 71 is used for passing bars 30 for fastening the laminations 20 together.

In the example described, each extension 24 also includes free fins 75, outside the groups 70, the free fins 75 being of heights that taper off on going away from the groups 70.

In the example described, these fins 75 are three in number per group 70, with their heights decreasing, e.g. from a value that is slightly smaller than the height of the fins 27 down to a value that is substantially equal to half the height of the fins 27.

The spacing between the fins 75 and 27 or 27 and 72 may, for example, be substantially constant and equal to i.

Within a given subassembly 60, the laminations 20 are exactly superposed on one another.

Two consecutive subassemblies 60 are offset angularly, e.g. by one-eighth of a revolution, such that the channels 26 of one subassembly 60 open out into a wide zone 100 outside the channels 26 of the subassembly 60 that follows it in the flow direction of the cooling fluid.

This alternation of the flow within the channels 26 and outside the channels 26 improves cooling considerably. The stator 1 may be provided with fins over its entire periphery and over its entire length, but the fins are interrupted, thereby improving the convective effect. In addition, the staggered disposition of the subassemblies 60 combined with the relatively low height of the extensions ensures that magnetic characteristics are relatively uniform for the stator as a whole.

The height of the fins 27 and their thickness are selected so as to obtain the best compromise between the flow section for the cooling fluid and the effectiveness of the fins.

In general, the thinner a fin, the smaller its effectiveness because of its limited thermal conductivity, but the greater the potential flow rate of cooling fluid, with the fluid that passes through the channels 26 also serving to cool the winding overhangs.

Preferably, the effectiveness of the fins is selected to be greater than 50% and their thickness is selected to offer a flow section to the cooling fluid that is not less than 60% of the section that would be available in the absence of the extensions.

The hydraulic diameter of the channels, which may be defined as being equal to four times the flow section divided by the wetted perimeter $P_w$, may be used to determine the optimum number of packets to be arranged in a staggered configuration, which in turn may be the result of another compromise between head loss and thermal effectiveness.

Preferably, each subassembly 60 is short enough to increase the mean heat exchange coefficient significantly, but the subassemblies are preferably not too numerous so that the head loss remains acceptable and does not excessively decrease the flow rate. The length of each subassembly may advantageously lie in the range 1 to 20 times, better in the range 5 to 10 times, the hydraulic diameter of the channels 26.

Figures 5, 6:
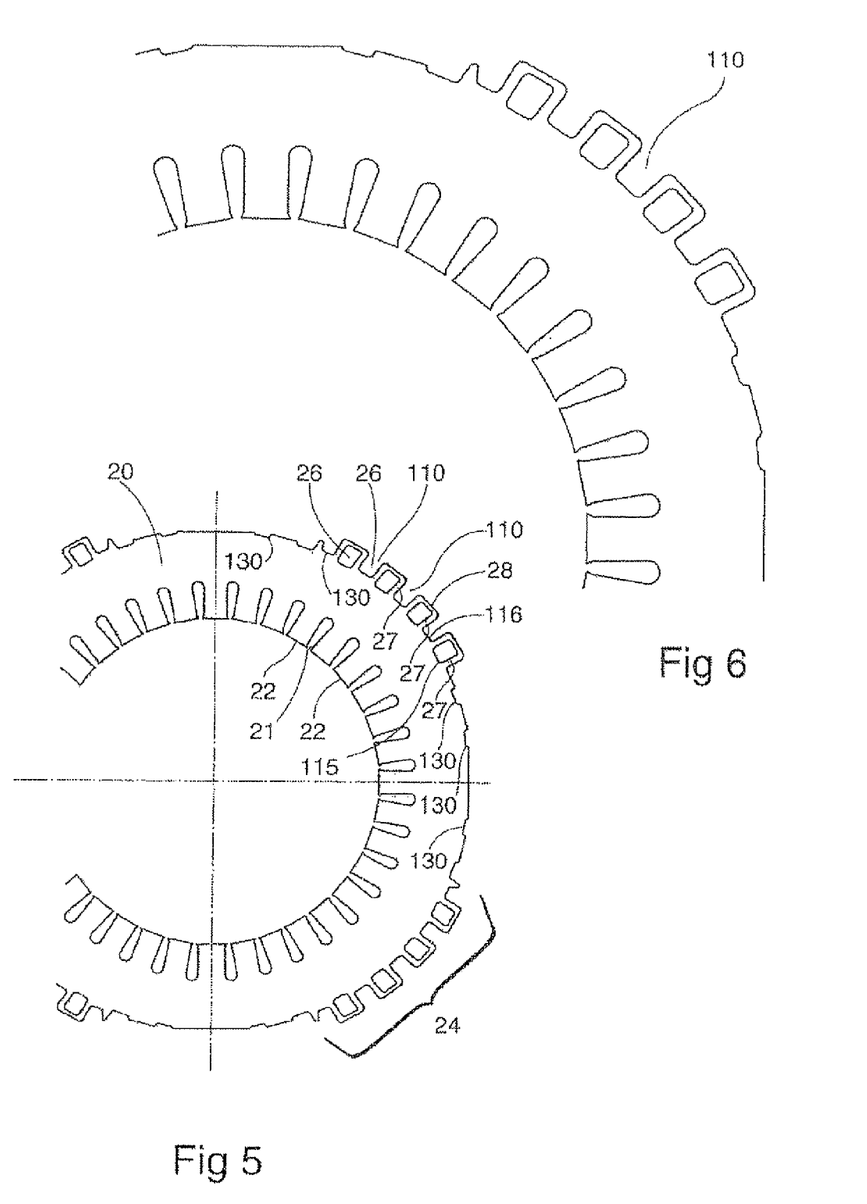
FIG. 5 is a fragmentary view of a stator lamination in a variant embodiment.
FIG. 6 shows a detail of FIG. 5.

FIGS. 5 and 6 show a stator lamination 20 in a variant embodiment of the invention. This lamination may replace the lamination described above.

In this example, the lamination has a plurality of extensions 24, e.g. four in number, substantially in four corners. Each of the extensions 24 project beyond the mean magnetic diameter of the lamination.

Each extension 24 comprises a succession of fins 27 that are connected together in pairs by peripheral connections 28, with these connections alternating with empty spaces formed between the fins.

The channels 26 present radially inner edges 115 and 116 that are not all situated at the same distance from the center of the lamination 20.

In the example shown, the edges 115 of the channels 26 that are closed on the outside by the peripheral connections 28 are at a shorter distance from the center than are the edges 116 of the channels 26 that are radially open on the outside, because of the spaces 110 replacing the connections 28. The closer edges 115 are angularly in register with teeth 22 of the stator, while the edges 116 are angularly in register with the slots 21, and they enable the width of the lamination to be greater. This configuration makes it possible to obtain the same flow section for air in two consecutive channels, while increasing the width of the magnetic yoke in register with each slot and reducing thermal unbalances within the stack of laminations, which imbalances could be harmful to the aging of the insulation covering the laminations.

The lamination 20 also has notches 130 situated between two consecutive extensions.

In each subassembly, the laminations 20 are superposed exactly and they are angularly offset relative to the laminations of the adjacent subassembly, given the staggered configuration of the subassemblies. The bottom of a notch 130 of one subassembly then lies flush with an edge 115 of the adjacent subassembly, thereby avoiding forming any steps at the outlets from the corresponding channels, and thus reducing head loss.

Naturally, the invention is not limited to the embodiments described above.

In particular, the shape of the extensions 24 and the shape of the channels 26 may be modified, which channels need not be formed between fins.

The flow of cooling fluid may go from one end of the machine to the other, or it may follow some other path, e.g. starting from a middle region and going towards end regions.

The flow of cooling fluid may be forced with the help of one or more fans.

The channels need not be formed integrally with each lamination but may be formed by fitting one or more casings on the stack of stator laminations, with the stack and/or the casing(s) including fins, for example.

The stack of laminations may be fastened within the jacket in various ways, e.g. without any bars and/or with welds between the stack of laminations and the jacket, on the outside of the jacket.

The machine may include a front flange and a rear flange that are interconnected by threaded tubes at their ends, passing through channels in the extensions or through spaces left empty between the jacket and the stack of stator laminations.

The term "comprising a" should be understood as being synonymous with "comprising at least one" unless specified to the contrary.

The invention claimed is:

1. A stator for a rotary electric machine, the stator comprising:
   a jacket; and
   a stack of stator laminations located inside the jacket, each lamination of the stack comprising subassemblies, wherein:
   the subassemblies include extensions having flow channels for passing a cooling fluid therethrough, each extension comprising a plurality of fins forming the flow channels between them,
   the subassemblies are disposed to subject the cooling fluid flowing along the stack of stator laminations to a first succession of passes within the flow channels and a second succession of passes through wide zones extending between the flow channels, the laminations of the stack being configured such that for at least one extension, a first flow section made available to the flow of the cooling fluid within the extension is greater than a second flow section defined by a space extending radially between a top of the extension and the jacket,
   at least two fins of the plurality of fins are connected together by a peripheral connection, with at least one of the flow channels being formed between the at least fins,
   the flow channels include at least two first radially inner edges that are situated angularly in alignment with two consecutive teeth of the stator and a second radially inner edge situated angularly in alignment with a slot between the two consecutive teeth, and
   the two first radially inner edges are closer to an axis of the stator than the second radially inner edge.

2. The stator according to claim 1, wherein flow channels that are defined radially inwards by the edges further from the axis are radially open towards the jacket, while flow channels that are defined by the edges closer to the axis are closed radially by portions of lamination.

3. The stator according to claim 2, wherein the portions of lamination comprise peripheral connections interconnecting the at least two fins, so as to obtain an available flow section for the cooling fluid that is of substantially equal volume for two consecutive channels of an extension.

4. The stator according to claim 1, the stack of laminations including notches that extend continuously from the radially inner edges of the flow channels when the subassemblies of the stack of laminations are disposed in a staggered configuration.

5. The stator according to claim 1, wherein $s_1 \leq 0.3\, s_e$, where $s_1$ is a flow area associated with a space between a top surface of an extension and the jacket, and $s_e$ is a flow area within an extension.

6. The stator according to claim 5, where $s_1 \leq 0.2 s_e$.

7. The stator according to claim 5, where $s_1 \leq 0.1 s_e$.

8. The stator according to claim 5, where $s_1 \leq 0.05 s_e$.

9. The stator according to claim 5, where $s_1 \leq 0.01 s_e$.

10. The stator according to claim 1, wherein the extensions of the subassemblies are disposed in a staggered configuration.

11. The stator according to claim 1, wherein the plurality of fins including at least three fins.

12. The stator according to claim 11, wherein the plurality of fins comprises between five and 50 fins.

13. The stator according to claim 1, wherein effectiveness of the fins being greater than or equal to 50 percent.

14. The stator according to claim 1, wherein all of the plurality of fins within an extension and between which the channels are formed are connected together by peripheral connections.

15. The stator according to claim 1, wherein the peripheral connections being made integrally with the fins.

16. The stator according to claim 1, wherein the stator laminations of the stack being identical.

17. The stator according to claim 1, wherein each subassembly having at least four extensions.

18. The stator according to claim 1, wherein each extension including a recess for receiving a bar for holding the stack of stator laminations together.

19. The stator according to claim 18, wherein the recess receiving at least one fin.

20. The stator according to claim 1, wherein each extension including unconnected fins on either side of the flow channels.

21. The stator according to claim 20, wherein each of the unconnected fins presenting a height that decreases when measured moving in a direction away from the channels.

22. The stator according to claim 20, wherein each extension including at least two unconnected fins.

23. The stator according to claim 1, wherein each extension extending angularly over an angular sector lying in the range of between 30° to 60°.

24. The stator according to claim 1, further including a flow section made available to the flow of cooling fluid between the jacket and the stator being greater than or equal to 60% of a flow section that would exist in the absence of the extensions.

25. The stator according to claim 1, wherein a dimension of a subassembly along the axis of rotation of the rotary electric machine lying in a range of between 2 to 20 times a hydraulic diameter of the flow channels.

26. The stator according to claim 1, wherein the flow channels being formed via cut outs in the laminations.

27. The stator according to claim 1, wherein the cooling fluid being air.

28. The stator according to claim 1, wherein a dimension of a wide zone of the rotary electric machine, as measured along the axis of rotation, being substantially equal to a dimension of an adjacent subassembly.

29. The stator according to claim 1, wherein each subassembly having at least two superposed laminations.

30. The stator according to claim 1, wherein the number of subassemblies lying in a range between 2 to 1000.

31. The stator according to claim 1, wherein a length of at least one extension as measured along the axis of rotation of the electric rotary machine is greater than a distance through which the at least one extension projects relative to the wide zones.

32. A stator for a rotary electric machine, the stator comprising:
   a jacket; and
   a stack of stator laminations located inside the jacket, each lamination of the stack comprising subassemblies, wherein:

the subassemblies include extensions having flow channels for passing a cooling fluid therethrough, each extension comprising a plurality of fins forming the flow channels between them, the subassemblies are disposed to subject the cooling fluid flowing along the stack of stator laminations to a first succession of passes within the flow channels and a second succession of passes through wide zones extending between the flow channels, the laminations of the stack being configured such that for at least one extension, a first flow section made available to the flow of the cooling fluid within the extension is greater than a second flow section defined by a space extending radially between a top of the extension and the jacket, at least two fins of the plurality of fins are connected together by a peripheral connection, with at least one of the flow channels being formed between the at least two fins, the flow channels include first flow channels and second flow channels that alternate within the extension around an outer periphery of the laminations, and the first flow channels having radially inner edges that are situated angularly in alignment with teeth of the stator and closer to an axis than radially inner edges of second flow channels that are situated angularly in alignment with slots.

33. A stator lamination for a rotary electric machine, the stator lamination comprising:

a magnetic yoke with teeth and slots formed on a radially inner side of the magnetic yoke and with flow channels formed between fins on a radially outer side of the magnetic yoke, flow channels include first flow channels and second flow channels that alternate, first flow channels being situated angularly in alignment with teeth and flow channels being situated angularly in alignment with slots, the first flow channels present radially inner edges that are closer to a center of the stator lamination than radially inner edges of the second flow channels, the first flow channels are radially closed on the outside by portions of lamination, with peripheral connections interconnecting adjacent fins, and the second flow channels in alignment with slots are open radially outwards, and flow sections of two consecutive flow channels are substantially similar.

34. The stator lamination of claim 33, wherein a radial dimension of the peripheral connections is substantially the same as the difference between a first radius of a first radially inner edge of a cooling channel and a second radius of a second radial inner edge of a consecutive cooling channel.

35. The stator lamination of claim 33, further including a plurality of notches outside zones having the channels, the plurality of notches being of a depth such that their bottoms lie at substantially the same distance from the center of the lamination as the radially inner edges of the first portion of cooling channels.

36. The stator lamination of claim 33, wherein the angular spacing between at least two consecutive slots is equal to an angular spacing that exists between two consecutive cooling channels situated angularly in alignment with teeth of the stator laminate.

37. The stator laminations of claim 36, wherein the number of peripheral connections and the number of slots is equal to sixteen.

38. The stator lamination according to claim 20, wherein the cooling channels are formed between fins.

39. The stator lamination according to claim 33, wherein the channel situated angularly in alignment with teeth is radially closed on the outside by portions of lamination.

40. A stator for a rotary electric machine, the stator comprising:

a jacket; and a stack of stator laminations located inside the jacket, each lamination of the stack comprising subassemblies, wherein:

the subassemblies include extensions having flow channels, defined by radially inner edges, for passing a cooling fluid therethrough, each extension comprising a plurality of fins forming the flow channels between them, the subassemblies are disposed to subject the cooling fluid flowing along the stack of stator laminations to a first succession of passes within the flow channels and a second succession of passes through wide zones extending between the flow channels, the laminations of the stack being configured such that for at least one extension, a first flow section made available to the flow of the cooling fluid within the extension is greater than a second flow section defined by a space extending radially between a top of the extension and the jacket, and at least two fins of the plurality of fins are connected together by a peripheral connection that is a circular arc centered on a longitudinal axis of the stator with at least one of the flow channels being formed between the at least two fins.

41. The stator according to claim 40, wherein each extension includes a recess separating two groups of consecutive fins united by peripheral connections, said recess for receiving a bar for holding the stack of stator laminations together.

42. A stator for a rotary electric machine, the stator comprising:

a jacket; and a stack of stator laminations located inside the jacket, each lamination of the stack comprising subassemblies, wherein:

the subassemblies include extensions having flow channels for passing a cooling fluid therethrough, each extension comprising a plurality of fins forming the flow channels between them, the laminations of the stack being configured such that for at least one extension, a first flow section made available to the flow of the cooling fluid within the extension is greater than a second flow section defined by a space extending radially between a top of the extension and the jacket, at least two fins of the plurality of fins are connected together by a peripheral connection, with at least one of the flow channels being formed between the at least two fins, and each extension includes unconnected fins on either side of the flow channels, the subassemblies are disposed to subject the cooling fluid flowing along the stack of stator laminations to a first succession of passes within the flow channels and a second succession of passes through wide zones extending between the flow channels, the unconnected fins on either side of the flow channels of extensions of a subassembly, being in line with fins forming flow channels of a subassembly that follows it in the flow direction of the cooling fluid.

43. A stator for a rotary electric machine, the stator comprising:
- a jacket; and
- a stack of stator laminations located inside the jacket, each lamination of the stack comprising subassemblies, wherein:
- the subassemblies include extensions having flow channels for passing a cooling fluid therethrough, each extension comprising a plurality of fins forming the flow channels between them,
- the subassemblies are disposed to subject the cooling fluid flowing along the stack of stator laminations to a first succession of passes within the flow channels and a second succession of passes through wide zones extending between the flow channels, defined by a circularly cylindrical surface of the stack of laminations of angular extent that is greater than or equal to 30° around the axis of rotation of the machine,
- the laminations of the stack being configured such that for at least one extension, a first flow section made available to the flow of the cooling fluid within the extension is greater than a second flow section defined by a space extending radially between a top of the extension and the jacket, and
- at least two fins of the plurality of fins are connected together by a peripheral connection, with at least one of the flow channels being formed between the at least two fins.

\* \* \* \* \*

UNITED STATES PATENT AND TRADEMARK OFFICE
CERTIFICATE OF CORRECTION

| | |
|---|---|
| PATENT NO. | : 8,427,018 B2 |
| APPLICATION NO. | : 12/678954 |
| DATED | : April 23, 2013 |
| INVENTOR(S) | : Alexis Dutau et al. |

It is certified that error appears in the above-identified patent and that said Letters Patent is hereby corrected as shown below:

ON THE TITLE PAGE:

Item (73) - please correct the Assignee name as follows:

Change "Moteur Leroy-Somer" to -- Moteurs Leroy-Somer --.

Signed and Sealed this
Twenty-sixth Day of November, 2013

Margaret A. Focarino
*Commissioner for Patents of the United States Patent and Trademark Office*